US010498614B2

(12) United States Patent
Tal et al.

(10) Patent No.: US 10,498,614 B2
(45) Date of Patent: *Dec. 3, 2019

(54) CONTENT PRIORITIZATION BASED ON PACKET SIZE

(71) Applicant: Facebook, Inc., Menlo Park, CA (US)

(72) Inventors: Eran Tal, San Jose, CA (US); Benoit M. Schillings, Los Altos Hills, CA (US); Michael John McKenzie Toksvig, Palo Alto, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,393

(22) Filed: May 31, 2017

(65) Prior Publication Data
US 2017/0264510 A1    Sep. 14, 2017

Related U.S. Application Data

(63) Continuation of application No. 13/618,710, filed on Sep. 14, 2012, now Pat. No. 9,716,635.

(51) Int. Cl.
*H04L 12/26* (2006.01)
*H04L 12/801* (2013.01)
*H04W 72/12* (2009.01)
*H04W 28/06* (2009.01)

(52) U.S. Cl.
CPC .......... *H04L 43/04* (2013.01); *H04L 43/0882* (2013.01); *H04L 47/10* (2013.01); *H04W 28/06* (2013.01); *H04W 28/065* (2013.01); *H04W 72/12* (2013.01); *H04W 72/1242* (2013.01); *H04W 72/1247* (2013.01)

(58) Field of Classification Search
CPC ............. H04W 72/12; H04W 72/1242; H04W 72/1247; H04W 28/06; H04W 28/065; H04L 47/10; H04L 43/04; H04L 43/0882
USPC ......................................................... 709/203
See application file for complete search history.

(56) References Cited

U.S. PATENT DOCUMENTS

| 8,095,613 | B1* | 1/2012 | Perkowitz | G06Q 10/109 709/206 |
| 9,461,955 | B1* | 10/2016 | Sherrets | H04L 51/32 |
| 9,716,635 | B2* | 7/2017 | Tal | H04L 43/0882 |
| 2009/0092137 | A1* | 4/2009 | Haigh | H04L 12/4641 370/392 |
| 2011/0040844 | A1* | 2/2011 | Lawler | G06F 15/16 709/206 |
| 2011/0274006 | A1* | 11/2011 | Mills | H04L 12/1886 370/252 |

(Continued)

*Primary Examiner* — James E Springer
(74) *Attorney, Agent, or Firm* — Baker Botts L.L.P.

(57) ABSTRACT

In one embodiment, a method includes determining one or more bandwidth constraints on a bandwidth of a communication channel available to a first computing device; determining a plurality of data items to transmit from the first computing device; ranking each data item based at least in part on an affinity between a user and an originator of the data item in a social-networking system; selecting, based at least in part on the ranking of the data items, one or more particular ones of the data items to transmit from the first computing device from the first computing device; and writing the particular ones of the data items to a queue for subsequent transmission.

16 Claims, 6 Drawing Sheets

(56) References Cited

U.S. PATENT DOCUMENTS

| | | | |
|---|---|---|---|
| 2012/0284393 A1* | 11/2012 | Gandhi | H04W 72/1252 709/224 |
| 2014/0172973 A1* | 6/2014 | Zadorozny | H04L 67/26 709/204 |
| 2016/0105387 A1* | 4/2016 | Jackson | H04W 4/02 709/206 |
| 2018/0013708 A1* | 1/2018 | Lawler | G06F 17/30867 |

* cited by examiner

CONTENT PRIORITIZATION BASED ON PACKET SIZE

PRIORITY

This application is a continuation under 35 U.S.C. § 120 of U.S. patent application Ser. No. 13/618,710, filed 14 Sep. 2012.

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a client (which may be a mobile computing device) may communicate with a server (which may be a server in a social-networking system). The mobile device may send data in the form of packets to the server, and the server may send data in the form of packets to the mobile device. A process running on a first computing device (e.g. the server or the mobile device) may determine how to transmit data packets to a second computing device (e.g. the mobile device or the server). The first computing device may determine a number of data packets to transmit based, for example, on bandwidth or battery constraints. Each of the data packets may have a payload with a given payload capacity (e.g. a fixed size in bytes). The first computing device may determine outgoing data items for transmission to the second computing device and rank them, for example, based on the relative importance of the data in them (which may in part be determined by a data prioritization set by the social-networking system). Based at least in part on the ranking of the data items and the payload capacities of the data packets, the first computing device may select particular data items for transmission from the first computing device to the second computing device in the data packets.

DESCRIPTION OF EXAMPLE EMBODIMENTS

Figure 1:
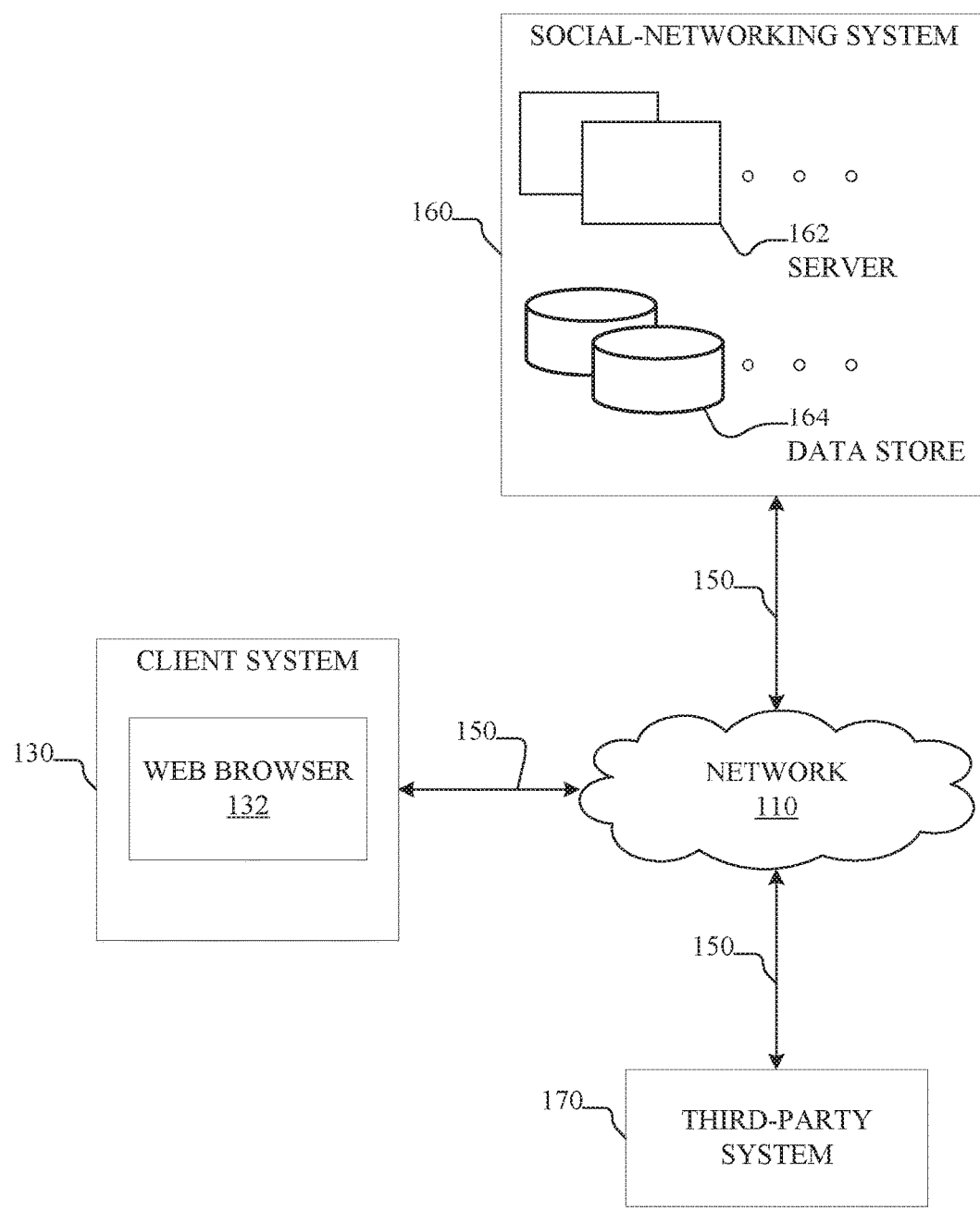
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g. that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client device 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client device 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client devices 130 or one or more third-party system 170 via network 110. The web server may include a mail server or other messaging functionality for receiving and routing messages between social-networking system 160 and one or more client devices 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client device 130. Information may be pushed to a client device 130 as notifications, or information may be pulled from client device 130 responsive to a request received from client device 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client devices 130 associated with users. Ad-pricing modules may combine social information, the current time, location information, or other suitable information to provide relevant advertisements, in the form of notifications, to a user.

Figure 2:
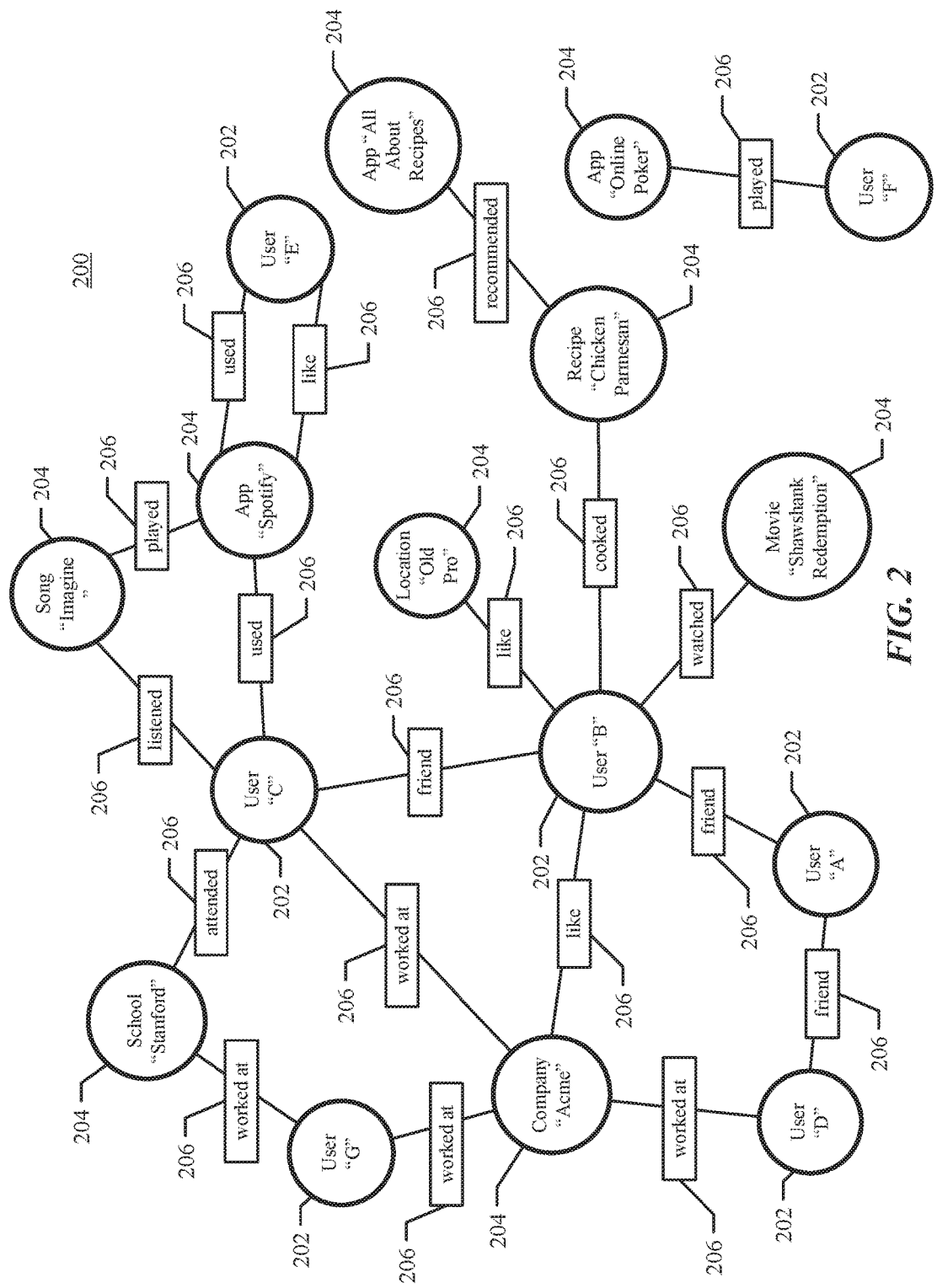
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages or one or more user-profile pages (which may be webpages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
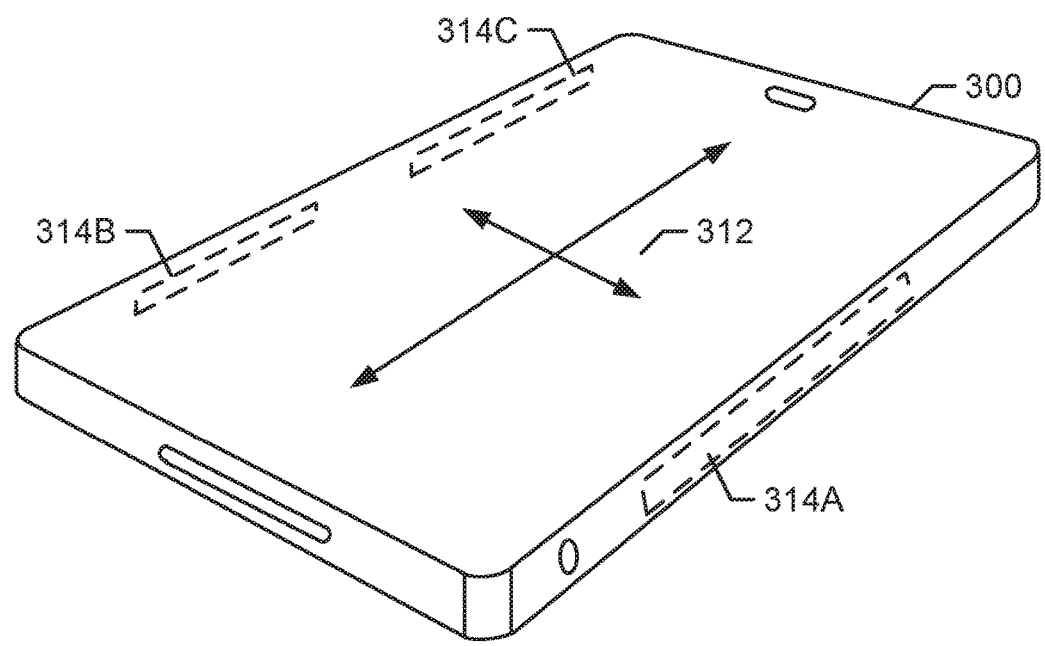
FIG. 3 illustrates an example client system.

FIG. 3 illustrates an example client system 130, a mobile device, which may communicate with a social-networking system 160 via a network 110. This disclosure contemplates mobile device 300 taking any suitable physical form. As example and not by way of limitation, mobile device 300 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 300 may have a touch screen 312 as an input component. In the example of FIG. 3, touch screen 312 is incorporated on a front surface of mobile device 300. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 314A-C may be incorporated into one or more sides of mobile device 300. Antennae 314A-C are components that convert electric current into radio waves, and vice versa. During transmission of signals, a transmitter applies an oscillating radio frequency (RF) electric current to terminals of antennae 314A-C, and antennae 314A-C radiate the energy of the applied the current as electromagnetic (EM) waves. During reception of signals, antennae 314A-C convert the power of an incoming EM wave into a voltage at the terminals of antennae 314A-C. The voltage may be transmitted to a receiver for amplification.

Figure 4:
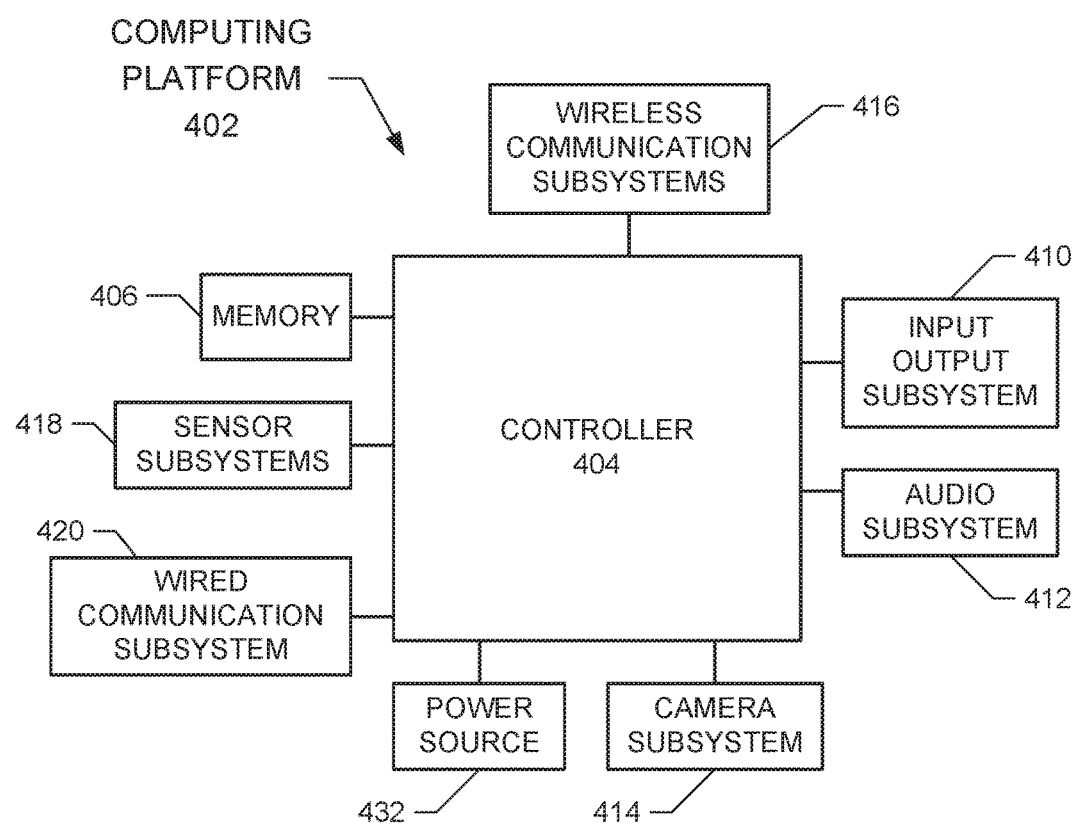
FIG. 4 illustrates an example computing platform of a mobile device.

While the mobile device 300 may be implemented in a variety of different hardware and computing systems, FIG. 4 shows a schematic representation of the main components of an example computing platform of a mobile device, according to various particular embodiments. In particular embodiments, computing platform 402 may comprise controller 404, memory 406, and input output subsystem 410. In particular embodiments, controller 404 which may comprise one or more processors and/or one or more microcontrollers configured to execute instructions and to carry out operations associated with a computing platform. In various embodiments, controller 404 may be implemented as a single-chip, multiple chips and/or other electrical components including one or more integrated circuits and printed circuit boards. Controller 404 may optionally contain a cache memory unit for temporary local storage of instructions, data, or computer addresses. By way of example, using instructions retrieved from memory, controller 404 may control the reception and manipulation of input and output data between components of computing platform 402. By way of example, controller 404 may include one or more processors or one or more controllers dedicated for certain processing tasks of computing platform 402, for example, for 2D/3D graphics processing, image processing, or video processing.

Controller 404 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 406 that is operatively coupled to controller 404.

Memory 406 may encompass one or more storage media and generally provide a place to store computer code (e.g. software and/or firmware) and data that are used by computing platform 402. By way of example, memory 406 may include various tangible computer-readable storage media including Read-Only Memory (ROM) and/or Random-Access Memory (RAM). As is well known in the art, ROM acts to transfer data and instructions uni-directionally to controller 404, and RAM is used typically to transfer data and instructions in a bi-directional manner. Memory 406 may also include one or more fixed storage devices in the form of, by way of example, hard disk drives (HDDs), solid-state drives (SSDs), flash-memory cards (e.g. Secured Digital or SD cards), among other suitable forms of memory coupled bi-directionally to controller 404. Information may also reside on one or more removable storage media loaded into or installed in computing platform 402 when needed. By way of example, any of a number of suitable memory cards (e.g. SD cards) may be loaded into computing platform 402 on a temporary or permanent basis.

Input output subsystem 410 may comprise one or more input and output devices operably connected to controller 404. For example, input output subsystem may include keyboard, mouse, one or more buttons, and/or, display (e.g. liquid crystal display (LCD), or any other suitable display technology). Generally, input devices are configured to transfer data, commands and responses from the outside world into computing platform 402. The display is generally configured to display a graphical user interface (GUI) that provides an easy to use visual interface between a user of the computing platform 402 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 410 may also include touch based devices such as touch pad and touch screen. A touchpad is an input device including a surface that detects touch-based inputs of users. Similarly, a touch screen is a display that detects the presence and location of user touch inputs. Input output system 410 may also include dual touch or multi-touch displays or touch pads that can identify the presence, location and movement of more than one touch inputs, such as two or three finger touches.

In particular embodiments, computing platform 402 may additionally comprise audio subsystem 412, camera subsystem 412, wireless communication subsystem 416, sensor subsystems 418, and/or wired communication subsystem 420, operably connected to controller 404 to facilitate various functions of computing platform 402. For example, Audio subsystem 412, including a speaker, a microphone, and a codec module configured to process audio signals, can be utilized to facilitate voice-enabled functions, such as voice recognition, voice replication, digital recording, and telephony functions. For example, camera subsystem 412, including an optical sensor (e.g. a charged coupled device (CCD), image sensor), can be utilized to facilitate camera functions, such as recording photographs and video clips. For example, wired communication subsystem 420 can include a Universal Serial Bus (USB) port for file transferring, or a Ethernet port for connection to a local area network (LAN). Additionally, computing platform 402 may be powered by power source 432.

Wireless communication subsystem 416 can be designed to operate over one or more wireless networks, for example, a wireless PAN (WPAN) (e.g. a BLUETOOTH), a WI-FI network (e.g. an 802.11a/b/g/n network), a WI-MAX network, a cellular network (such as, for example, a Global System for Mobile Communications (GSM) network, a Long Term Evolution (LTE) network). Additionally, wireless communication subsystem 416 may include hosting protocols such that computing platform 402 may be configured as a base station for other wireless devices. Other input/output devices may include an accelerometer that can be used to detect the orientation of the device.

Sensor subsystem 418 may include one or more sensor devices to provide additional input and facilitate multiple functionalities of computing platform 402. For example, sensor subsystems 418 may include GPS sensor for location positioning, altimeter for altitude positioning, motion sensor for determining orientation of a mobile device, light sensor for photographing function with camera subsystem 414, temperature sensor for measuring ambient temperature, and/ or biometric sensor for security application (e.g. fingerprint reader).

In particular embodiments, various components of computing platform 402 may be operably connected together by one or more buses (including hardware and/or software). As an example and not by way of limitation, the one or more buses may include an Accelerated Graphics Port (AGP) or other graphics bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these.

In particular embodiments, mobile device 300 and social-networking system 160 may communicate over network 110 via a packet-based communication protocol including, for example and without limitation, Transmission Control Protocol over Internet Protocol (TCP/IP). Although particular embodiments using TCP/IP will be discussed, it should be understood that any packet-, segment-, or frame-based communication protocol (e.g. at the transport, network, or data link layers) may be used to communicate data between mobile device 300 and social-networking system 160. In particular embodiments, mobile device 300 and a server 162 (e.g. a web server) of social-networking system 160 may communicate via a packet-based communication protocol such as TCP/IP. In the example of TCP/IP, a TCP network socket (e.g. one end of an end-to-end network connection between a client and a server) may be kept open at server 162, and data to be communicated to mobile device 300 may be pushed onto the TCP socket in the form of packets. Similarly, a TCP socket may be kept open at mobile device 300, and data to be communicated to server 162 may be pushed onto the TCP socket in the form of packets. The packets, segments, or frames used to communicate data using a given protocol, including, for example, TCP/IP may have a fixed size (e.g. payload size). For the sake of clarity, this disclosure will discuss data as being communicated in the form of packets with a fixed payload size of M bytes, but any suitable unit of data transmission with any suitable size (whether fixed or variable) is contemplated by this disclosure.

As described earlier, a user of a mobile device 300 may upload content to social-networking system 160. In particular embodiments, a user may utilize mobile device 300 to upload content or perform actions on social-networking system 160, including, for example, status updates or other textual data, location information, photos, videos, links, music or other similar data or media. In particular cases where a large number of clients using mobile devices serviced by, for example, the same carrier cellular tower are simultaneously attempting content uploads to social-networking system 160, the carrier's wireless cellular network may become overloaded. For example, in Universal Mobile Telecommunications Systems (UMTS), a particular Node B base station may only support a limited amount of data bandwidth. Because each application running on each mobile device 300 has its own bandwidth requirements, in a crowded environment, such as a baseball game or public event, a single Node B may become overloaded fairly quickly. As a result, users' socket connections to social-networking system 160 may time out, thereby causing their uploads or downloads of data to fail, and undermine the overall responsiveness and user experience.

Packets may have a fixed payload size, for example M bytes. The transmission of data in packets occurs using an integer number of packets (and, therefore, an integer multiple of M bytes). It may happen, however, that the data to be transmitted is of a size only slightly larger than M bytes. Transmitting this data would still require at least two M-byte data packets, but the second packet may be almost empty of data. Despite this fact, to fully transmit the data, both packets must be transmitted, and this requires twice the bandwidth usage of transmitting only one packet. Similarly, if the data to be transmitted is of a size only slightly larger than an integer multiple of M bytes, the final packet may still be almost empty of data. This situation may be exacerbated in the case of multiple applications running on a mobile device 300, as each application running on the mobile device 300 may have only a small amount of data to be transmitted (e.g. continuous status updates), but may transmit this data inefficiently by requiring the transmission of packets that are not full. Similarly, if a server (e.g. server 162) has a small amount of data to be transmitted (e.g. push notifications for a user), this data may also be transmitted inefficiently if it requires the transmission of packets that are not full.

In particular embodiments, the mobile device 300 may queue one or more of the content or activity posts for upload at a later time in order to, for example, conserve bandwidth. An example of throttling network traffic at a client-side device (e.g. mobile device 300) by queuing content for transmission to a social-networking system is disclosed in U.S. patent application Ser. No. 13/210,953, entitled "Server-Initiated Bandwidth Conservation Policies," filed 16 Aug. 2011, and incorporated herein by reference as an example only and not by way of limitation.

In particular embodiments, the transmission of data in packets may be adjusted, for example, to conserve bandwidth. The packet-transmission algorithm may include a prioritization or ranking of what content (e.g. which data items such as posts in social-networking system 160) are placed into a particular packet or group of packets. As an example, depending on bandwidth constraints, only the most important or relevant data (e.g. across multiple applications on mobile device 300) may be transmitted in packets. As another example, depending on bandwidth constraints, the most important or relevant data (e.g. across multiple applications on mobile device 300) may be transmitted first over less important data. Measures of importance or relevance are discussed further below. The packet-transmission algorithm may attempt to transmit packets that are as full of data as possible.

In particular embodiments, as part of the packet-transmission algorithm, the constraints on available bandwidth may be determined. In particular embodiments, social-networking system 160 may log certain geographic regions and times where overloading of network 110 (e.g. a wireless data network) is likely to occur. For example, based on a log of historical overloading of network 110 in particular geographic regions (e.g. determined by data uploaded by client systems 130 including mobile device 300), social-networking system 160 may form an estimate of the data transmission capacity of network 110 in the geographic regions. In particular embodiments, social-networking system 160 may augment its database of network capacity information with external information, such as event databases or sporting event schedules. Social-networking system 160 may also determine constraints on available bandwidth by querying a network operator to determine how much capacity is available, for example, on a cell by cell basis. As an example, a wireless network operator may be queried by social-networking system 160 to determine how much bandwidth is available at a particular cell in the network operator's wireless network nearest to where a particular mobile device 300 is currently located. In yet other embodiments, the wireless network operator may be queried by mobile device 300 itself to determine how much bandwidth is available to mobile device 300 at the cell currently handling the data traffic to and from mobile device 300. In particular embodiments, characteristics of the operation of mobile device 300 may be used to determine constraints on bandwidth. These characteristics may, for example, be determined at mobile device 300, communicated to social-networking system 160, and used by mobile device 300 or social-networking system 160 to determine bandwidth constraints. As an example, the power state of mobile device 300 (e.g. battery level or an indication that the device is being charged) may be used to determine whether more or less bandwidth may be used by mobile device 300. If, for example, the device battery level is low, less bandwidth may be used by mobile device 300 (e.g. in order to conserve battery), and fewer packets, containing, for example, more important or relevant information, may be sent to or from mobile device 300. As another example, a user activity level of the user of mobile device 300 (e.g. whether the user is touching the device, or whether the device is stationary for long periods of time) may be used to determine whether more or less bandwidth may be used by mobile device 300. If, for example, a user is actively touching mobile device 300 (determined, e.g. by one or more touch sensor of sensor subsystems 418), more bandwidth may be used by mobile device 300 to enhance the user's experience, and more packets (e.g. with less important or relevant information) may be sent to or from mobile device 300. If, as another example, mobile device 300 has been stationary (e.g. sitting on a table) for more than a threshold amount of time (e.g. 20 minutes), less bandwidth may be used by mobile device 300 (e.g. in order to conserve battery), and fewer packets, containing, for example, more important or relevant information, may be sent to or from mobile device 300. As yet another example, the radio network characteristics of mobile device 300 (e.g. cellular signal strength, type of cellular network coverage, availability of WI FI, etc.) may be used to determine whether more or less bandwidth may be used by mobile device 300. If, for example, signal strength is weak, the mobile device 300 is in a roaming mode, or the mobile device 300 is outside a UMTS coverage area, less bandwidth may be used by mobile device 300 (e.g. in order to conserve battery or avoid unnecessary data charges), and fewer packets, containing, for example, more important or relevant information, may be sent to or from mobile device 300. If, as another example, the signal is strong or the device is in an area with WI FI availability, more bandwidth may be used by mobile device 300 to enhance the user's experience, and more packets (e.g. with less important or relevant information) may be sent to or from mobile device 300. The cost of bandwidth usage may also be used to determine whether more or less bandwidth may be used by mobile device 300. For example, in a home WI FI setting, the cost of bandwidth usage by mobile device 300 may be negligible, and mobile device 300 may use more bandwidth. As another example, in a 4G (fourth generation) cellular network, the cost of bandwidth usage by mobile device 300 may depend on a relatively small monthly bandwidth cap for an account associated with mobile device 300 (because bandwidth usage beyond this cap may be charged at much higher rates than bandwidth usage below this cap), and mobile device 300 may use more or less bandwidth depending on current usage in relation to the cap. Similarly, if mobile device 300 is in an international roaming mode, the cost of bandwidth usage by mobile device 300 may be very large, and mobile device 300 may use less bandwidth. Bandwidth availability or constraints may be determined on a per-user, per-device basis in any of the techniques described above.

As described above, based on a determination of bandwidth constraints or available bandwidth, social-networking system 160 (e.g. server 162), mobile device 300, or both may use a packet-transmission algorithm to determine a prioritization or ranking of what content (e.g. which data items such as posts in social-networking system 160) are placed into a particular packet or group of packets. The prioritization or ranking of content may occur based on a variety of factors and may involve content from a variety of applications on mobile device 300. In particular embodiments, a process (running on server 162, at mobile device 300, or both) may determine a value for each of the one or more outgoing data items. In particular embodiments, the process may determine a value for each of the one or more outgoing data items based on the content or type of each of the one or more outgoing data items. For example, the process may assign a higher value to a data item having content indicating urgency (e.g. a message with the words "urgent," "important," or "emergency"). As another example, the process may assign a higher value to a message sent directly to a user of mobile device 300 than it would to a notification that another user of social-networking system 160 has listened to a particular song. In particular embodiments, the process may determine a value for each of the one or more outgoing data items based on an affinity or social relevancy between each of the one or more outgoing data items and a user of mobile device 300—e.g. based on an affinity between each outgoing data item's originator and the user. Outgoing data items such as notifications of posts in specific groups relevant to a user of mobile device 300, replies to the user's own posts, or replies to the user's own comments on a post on social-networking system 160 may all be scored using affinity. For example, the process may assign each of the one or more outgoing data items an affinity value. For example, the process may assign an affinity value of 1.0 to an outgoing data item if the outgoing data item's originator is the immediate family member (e.g. parent, sibling) of a user of the mobile device 300, or an affinity value of 0.9 if the outgoing data item's originator frequently communicates with a user of mobile device 300, or an affinity value of 0.7 if the outgoing data item's originator is a first-degree social contact of a user of mobile device 300 in a social graph of social-networking system 160. Interaction between users (e.g. users of client devices 130) on social-networking system 160, such as chats, posts, emails, and the like, may also be used in scoring affinities between users of social-networking system. A system for measuring user affinity is described more generally in U.S. patent application Ser. No. 11/503,093, entitled "Providing a Newsfeed Based on User Affinity in a Social Network Environment," filed on Aug. 11, 2006, which is hereby incorporated by reference in its entirety as an example only and not by way of limitation. The prioritization or ranking of content may also occur based on categories. As an example, data items may be divided into categories such as "mandatory for transmission" and "optional for transmission." The division of data items into multiple categories may depend, for example, on the value of each data item, such that each category corresponds to a range of values for data items (e.g. a value of 0.5-1.0 corresponds to the mandatory transmission category, and a value of 0-0.49 corresponds to the optional transmission category).

Based on the determination of bandwidth constraints or available bandwidth and the prioritization or ranking of outgoing data items, social-networking system 160 (e.g. server 162), mobile device 300, or both may determine which data items are placed into a particular packet or group of packets for transmission. In particular embodiments, based on bandwidth constraints or available bandwidth, an available number of packets for transmission in a given time period is determined. For example, if the available bandwidth is determined to be 5 kilobytes per second, and each packet has a payload size M=40 bytes, then there are a total of 128 packets available for transmitting data items to mobile device 300 or server 126 in a one-second timeframe. In particular embodiments, once the total number of available packets for a timeframe is determined, the packet-transmission algorithm executed, for example, by a process (running on server 162, at mobile device 300, or both) may determine which data items are placed in these packets for transmission. The process may determine this based on a prioritization or ranking of outgoing data items based on values or categories of data items. For example, the process may determine that all mandatory data items are to be placed in packets and transmitted sequentially before any optional data items are placed in packets and transmitted. As an example, if the packet payload size is M=40 bytes, there are 5 available packets in a given timeframe, and there are 100 bytes of mandatory data items and 200 bytes of optional data items to be transmitted in the timeframe, the process may fill the first two packets with 80 total bytes of mandatory data items and send them. The process may then fill the third packet with the remaining 20 bytes of mandatory data items, and then seek to fill the remaining 20 bytes of the third packet with optional data items before sending it. The fourth and fifth packets may be filled with 80 total bytes of the optional data items. If the bandwidth is not enough to support the amount of mandatory data items (e.g. the packet payload size is M=40 bytes, there are 5 available packets in a given timeframe, and there are 300 bytes of mandatory data items), the process may choose to fill the available packets with mandatory data items (e.g. based on a ranking of the mandatory data items) and wait until the next timeframe to send the remaining bytes of mandatory data items. As another example, if the packet payload size is M=40 bytes, there are 5 available packets in a given timeframe, and there are 300 bytes of outgoing data items ranked by value, the process may seek to sequentially fill and send the five packets with the 200 bytes of data items ranked from most important or relevant (e.g. having the highest value) to least important or relevant. In the next timeframe, the remaining 100 bytes of outgoing data items may be sent, or, alternatively, in the next timeframe, the outgoing data items (including the remaining 100 bytes from the last timeframe) may again be ranked and then sent accordingly. In particular embodiments, the process may determine a threshold value that each of the one or more outgoing data items must meet or exceed in order to be placed into a packet for transmission. This threshold value may be dependent on bandwidth constraints. As an example, in a home WI FI setting, the threshold value may be relatively low; in a 4G cellular network when the current usage is near a usage cap, the threshold value may be relatively high; and if mobile device 300 is in an international roaming mode, the threshold value may be relatively very high.

In particular embodiments, the determination of which data items are placed into a particular packet or group of packets for transmission includes compressing the data items before transmission. The compression may be done by any suitable compression technique including, for example and without limitation, packet-by-packet dictionary compression or guess-table-based compression. As described above, the outgoing data items may be prioritized or ranked based, for example, on values or categories. As an example, if the outgoing data items are ranked based on the categories "mandatory" and "optional," the mandatory data items may be run through the compressor (or, in other embodiments, a compression simulator) to determine the number of bytes of compressed mandatory data items to be transmitted. The total number of bytes of post-compression mandatory data items may then be compared to the available bandwidth (e.g. the number of available packets in a given timeframe). For example, if there are N=75 total bytes of compressed mandatory data items and there are 5 available packets with payload size M=40 bytes each, then the first packet may be filled and sent with 40 bytes of compressed mandatory data items, and the second packet may be filled with 35 bytes of compressed mandatory data items. Generally, the number of packets with payload size M bytes to be completely filled with compressed mandatory data items of total size N bytes is determined by calculating N divided by M (and ignoring any remainder), and the number of bytes of remaining compressed mandatory data items is calculated via N modulo M. At this point, the remaining 5 bytes of the second packet (and the remaining 3 empty packets) may be filled with optional data items. The determination of which optional data items are prioritized to be placed into the second (and any subsequent) packet may be done in a variety of ways. In one embodiment, the optional data items may be ranked based on a value calculated for each of the optional data items, as described above. In another embodiment, the optional data items may be ranked based on a further categorization of data items (e.g. categories based on values), as described above. In yet another embodiment, the optional data items may be prioritized based on how one or more of the optional data items compress, and whether this leads to a desirable packing of bytes of the available packets (e.g. whether the packets would be as close to full as possible without overflowing). In the example above, an optional data item (or combination of optional data items) whose compressed data size is as close to 5 bytes as possible (e.g. in comparison with the other optional data items) may be chosen to fill the second packet. For the third, fourth, and fifth packets, any method of selecting or prioritizing optional data items (or any combination thereof) may be employed, including, for example, choosing for each packet the optional data items or set of optional data items within a certain category that compress to a size as close to M bytes as possible. The selection of data items for transmission based on compressed data size may be done dynamically, as the amount of compression may depend on the data items on hand for transmission; for example, multiple data items of similar formats may compress more than multiple data items of differing formats.

Figure 5:
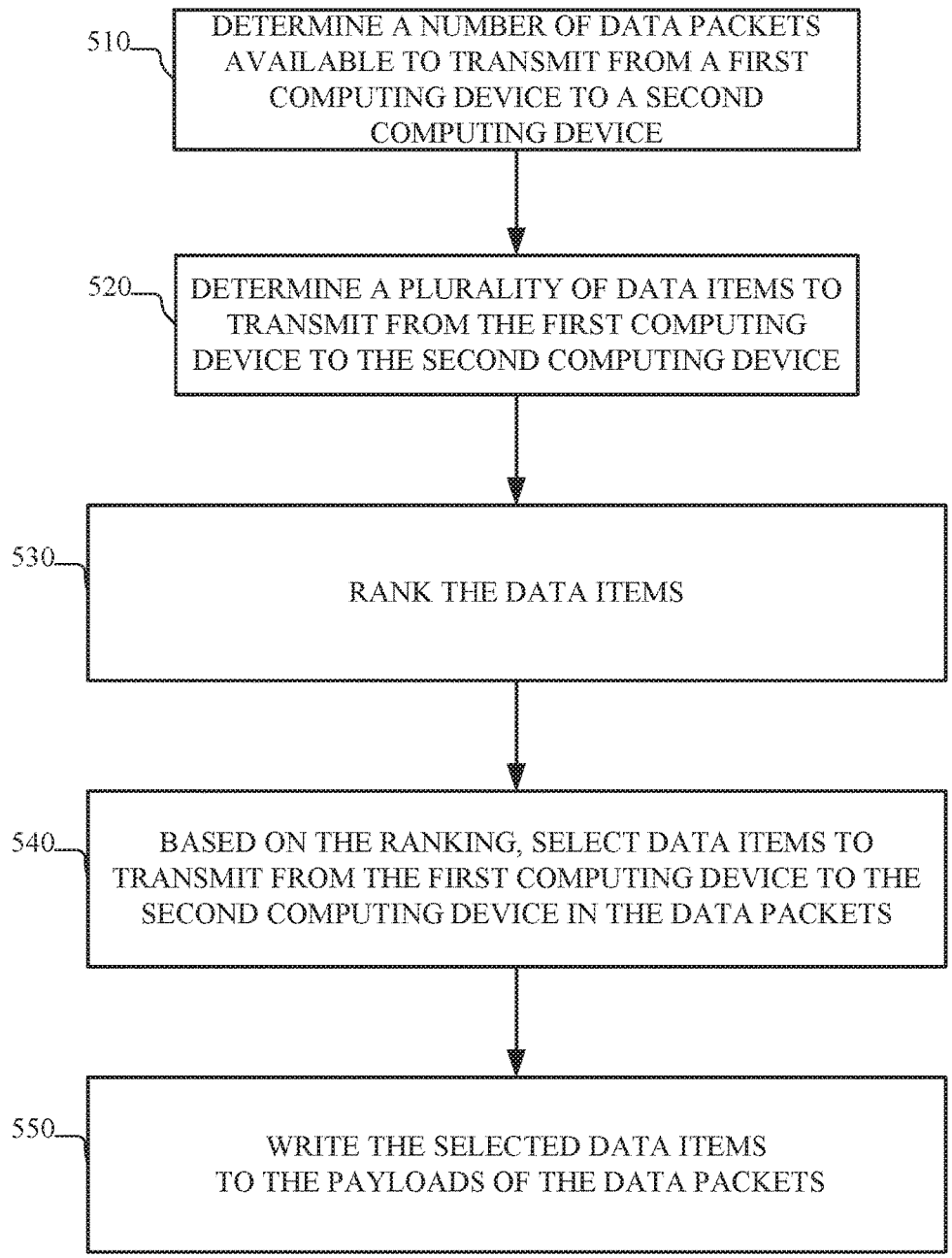
FIG. 5 illustrates an example method for transmitting data packets.

FIG. 5 illustrates an example method for transmitting data packets from a first computing device to a second computing device. At step 510, a first computing device determines a number of data packets available to transmit (e.g. based on bandwidth constraints or available bandwidth, as well as a data packet payload capacity) from the first computing device to a second computing device. The first computing device may be mobile device 300, and the second computing device may be server 162. The first computing device may be server 162, and the second computing device may be mobile device 300. Each of the data packets may have a payload with the data packet payload capacity (e.g. M bytes per packet) used to determine the number of data packets available for transmission. In particular embodiments, the payload capacity may vary from packet to packet and may vary over time. At step 520, the first computing device determines a plurality of data items (e.g. outgoing data items) to transmit from the first computing device to the second computing device. At step 530, the first computing device ranks the data items (e.g. by any of the prioritization or ranking techniques described above). At step 540, the first computing device selects, based at least in part on the ranking of the data items and the payload capacities of the data packets, one or more data items to transmit from the first computing device to the second computing device in the data packets. At step 550, the first computing device writes data items to the payloads of the data packets.

Figure 6:
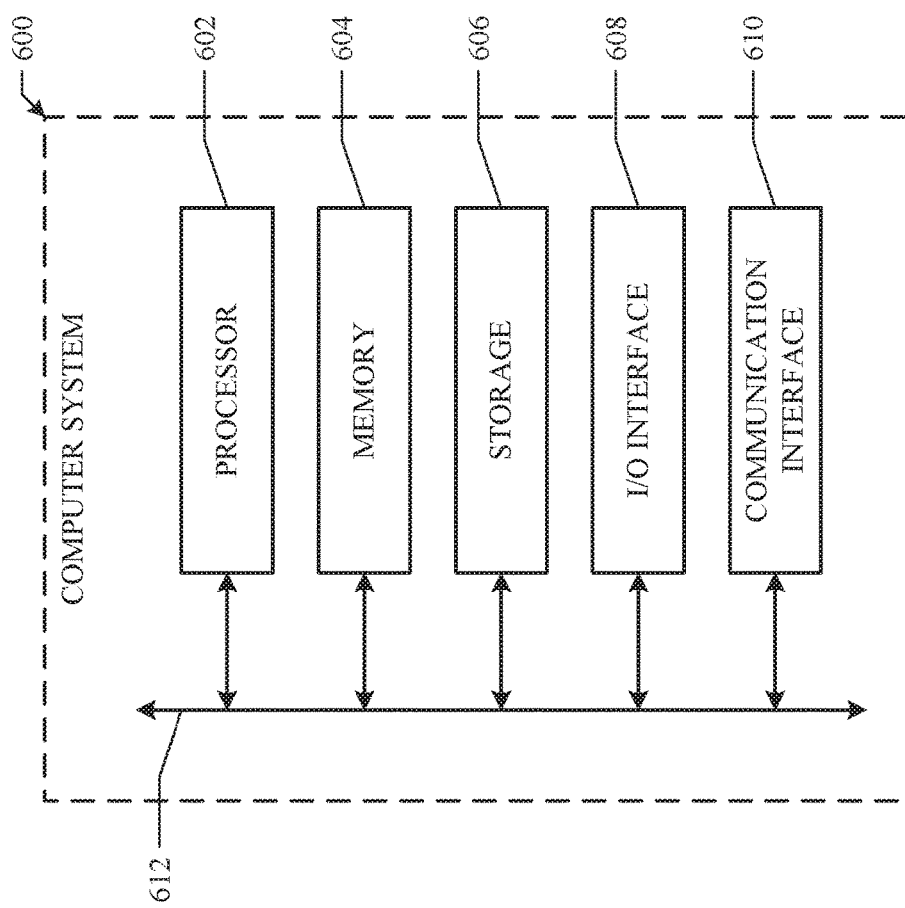
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, determining one or more bandwidth constraints on a bandwidth of a communication channel available to the computing device;
   by the computing device, determining a quantity of data items to transmit from the computing device based on a size of the data items and the bandwidth constraints;
   by the computing device, ranking each of the data items to transmit based at least in part on an affinity between a user and an originator of the data item in a social-networking system and the size of the data items, wherein a value of the affinity is based at least in part on interaction on the social-networking system between the user and the originator of the data item;
   by the computing device, selecting, based at least in part on the ranking of the data items, the quantity of the data items to transmit from the computing device; and
   by the computing device, writing the selected data items in an order based on the ranking to a queue for subsequent transmission.

2. The method of claim 1, wherein the selecting comprises selecting one or more of the particular ones of the data items having an affinity value higher than a threshold value.

3. The method of claim 2, wherein the threshold value is based at least in part on one or more of the bandwidth constraints.

4. The method of claim 1, further comprising determining an amount of data items based at least in part on the bandwidth constraints.

5. The method of claim 1, further comprising:
   determining a number of data packets available to transmit based on one or more of the bandwidth constraints;
   determining whether an amount of data of one or more of the data items is less than a payload capacity of one of the data packets; and
   writing data of a plurality of data items in a particular one of the data packets based on the determination that an amount of data of one or more of the data items is less than a payload capacity of one of the data packets.

6. The method of claim 1, wherein the ranking each data item is further based at least in part on a category assigned to each data item.

7. The method of claim 1, wherein the size of the data items is a compressed data size of each data item.

8. One or more computer-readable non-transitory storage media embodying software that is operable when executed to:
   determine one or more bandwidth constraints on a bandwidth of a communication channel available to a computing device;

determine a quantity of data items to transmit from the computing device based on a size of the data items and the bandwidth constraints;

rank each of the data items to transmit based at least in part on an affinity between a user and an originator of the data item in a social-networking system and the size of the data items, wherein a value of the affinity is based at least in part on interaction on the social-networking system between the user and the originator of the data item;

select, based at least in part on the ranking of the data items, the quantity of the data items to transmit from the computing device; and write the selected data items in an order based on the ranking to a queue for subsequent transmission.

9. The media of claim 8, wherein the software is further operable to select one or more of the particular ones of the data items having an affinity value higher than a threshold value.

10. The media of claim 9, wherein the threshold value is based at least in part on one or more of the bandwidth constraints.

11. The media of claim 8, wherein the software is further configured to:

determine a number of data packets available to transmit based on one or more of the bandwidth constraints;

determine whether an amount of data of one or more of the data items is less than a payload capacity of one of the data packets; and write data of a plurality of data items in a particular one of the data packets based on the determination that an amount of data of one or more of the data items is less than a payload capacity of one of the data packets.

12. The media of claim 8, wherein the ranking each data item is further based at least in part on a category assigned to each data item.

13. The media of claim 8, wherein the size of the data items is a compressed data size of each data item.

14. A system comprising:

one or more processors; and a memory coupled to the processors comprising instructions executable by the processors, the processors being operable when executing the instructions to:

determine one or more bandwidth constraints on a bandwidth of a communication channel available to a computing device;

determine a quantity of data items to transmit from the computing device based on a size of the data items and the bandwidth constraints;

rank each of the data items to transmit based at least in part on an affinity between a user and an originator of the data item in a social-networking system and the size of the data items, wherein a value of the affinity is based at least in part on interaction on the social-networking system between the user and the originator of the data item;

select, based at least in part on the ranking of the data items, the quantity of the data items to transmit from the computing device; and write the selected data items in an order based on the ranking to a queue for subsequent transmission.

15. The system of claim 14, wherein the software is further operable to select one or more of the particular ones of the data items having an affinity value higher than a threshold value.

16. The system of claim 15, wherein the threshold value is based at least in part on one or more of the bandwidth constraints.

* * * * *